United States Patent [19]

Gautier

[11] Patent Number: 4,817,500

[45] Date of Patent: Apr. 4, 1989

[54] BRAKING ASSISTANCE VACUUM SERVOMOTOR AND PROCESS FOR ADJUSTING SUCH A SERVOMOTOR

[75] Inventor: Jean-Pierre Gautier, Aulnay-sous-Bois, France

[73] Assignee: Bendix France, Drancy, France

[21] Appl. No.: 198,711

[22] Filed: May 18, 1988

[30] Foreign Application Priority Data

Oct. 22, 1985 [FR] France .................................. 8515678

[51] Int. Cl.4 ............................................. F15B 9/10
[52] U.S. Cl. ................................... 91/376 R; 91/369.2
[58] Field of Search ...................... 60/547.1; 91/369.1, 91/369.2, 369.3, 369.4, 376 R, 389; 92/13.7, 13.8

[56] References Cited

U.S. PATENT DOCUMENTS

| 3,795,426 | 3/1974 | Sisson | 91/376 R X |
| 4,005,638 | 2/1977 | Takeuchi | 91/376 R X |
| 4,227,371 | 10/1980 | Takeuchi | 60/547 R |
| 4,358,990 | 11/1982 | Takeuchi | 91/376 R |
| 4,393,749 | 7/1983 | Miyazaki | 91/369 A X |
| 4,428,274 | 1/1984 | Takeuchi et al. | 91/369 A |

FOREIGN PATENT DOCUMENTS 158552 10/1985 European Pat. Off. .
2084274 4/1982 United Kingdom .

Primary Examiner—Robert E. Garrett
Assistant Examiner—M. Williamson
Attorney, Agent, or Firm—Larry J. Palguta; Ken C. Decker

[57] ABSTRACT

The return spring (16) for the actuating rod (14) of the servomotor bears against a tubular stop member (18) which is slidably mounted on the rod (14) and which comes to bear, in the rest position of the servomotor, against a reference stop (22), a ring (21) being firmly fixed to the rod (14) when contacting, in an inactive condition of the servomotor, against the tubular stop member (18) after having exerted a pull on the rod (14) bringing the valve seat (12) formed by the valve plunger (13) into full contact with the valve member (10) of the distribution valve means (6) of the servomotor.

8 Claims, 1 Drawing Sheet

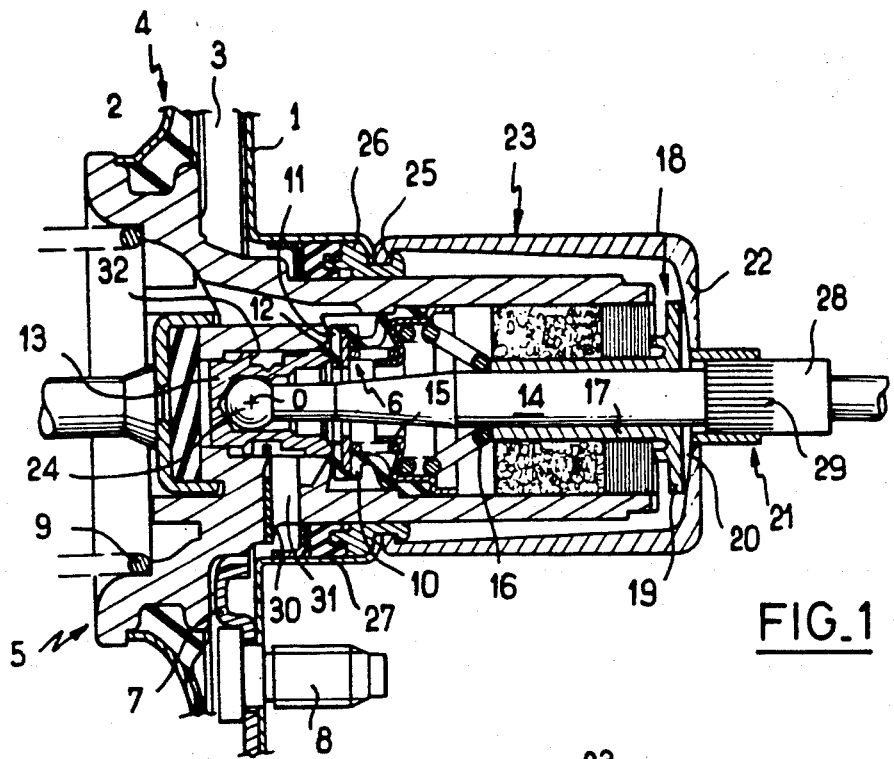
FIG.1
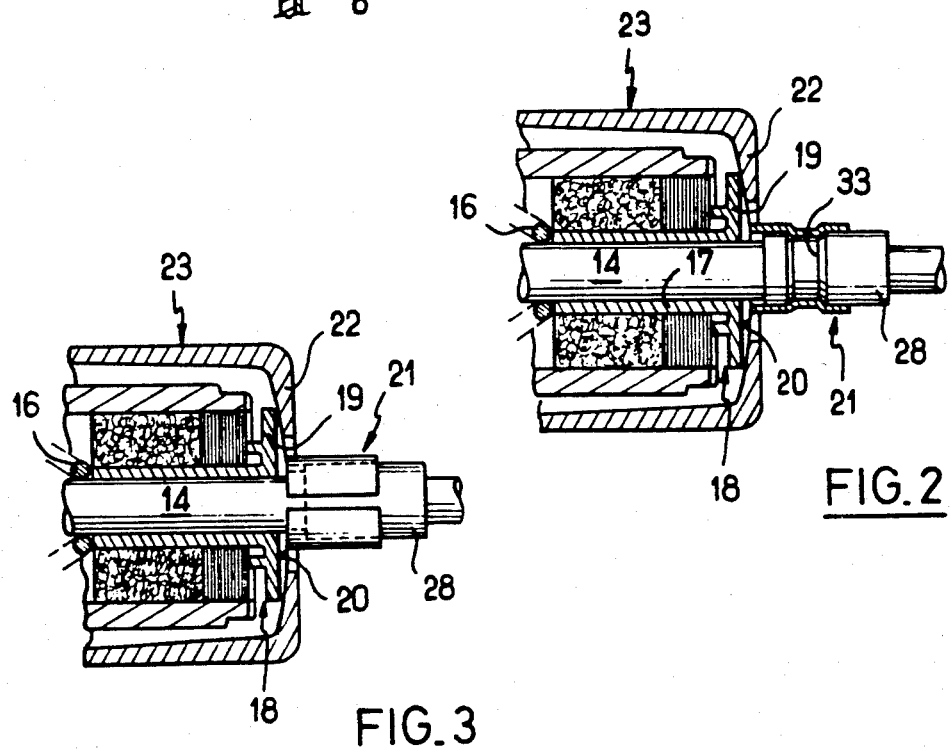
FIG.2
FIG.3

BRAKING ASSISTANCE VACUUM SERVOMOTOR AND PROCESS FOR ADJUSTING SUCH A SERVOMOTOR

This is a continuation of abandoned application Ser. No. 915,445 filed 10-6-86 now abandoned.

The present invention relates to vacuum servomotors for assisting with braking, more particularly for motor vehicles, of the type comprising: a casing which comprises a rear portion and which is divided internally into a vacuum chamber, or front chamber, and a working chamber, or rear chamber, by a piston structure which is biased by a piston spring towards the rear portion of the casing and which comprises a hub which encloses a distribution valve means including a first valve seat, formed by the hub, a second valve seat, which is coaxial with the first valve seat and is formed by the end of a plunger which slides in the hub and which is connected to an actuating rod of the servomotor, and a valve member which is mounted in the hub and is biased axially by a valve spring towards the first and second valve seats so as to cooperate with the latter, a rod return spring, which is coaxial with the rod and is situated between the hub and a tubular stop member which is slidably mounted on the rod and which comprises, remote from the rod return spring, first and second bearing surfaces which are intended to cooperate respectively with a first stop on the rod, and a second or reference stop, having at least a fixed reference position.

A servomotor of this type is described in the document EP-A-O, 158,552, whose content is assumed to be incorporated herewith for reference. The arrangement of the servomotor of the document allows a zero dead travel to be obtained, the piston structure and the valve plunger automatically adopting self-adaptive relative rest positions. However, in order to obtain this range of self-adaptation, with a final rest position, in a condition of use of the servomotor, of the piston structure which is offset by a certain distance which is not perfectly controllable from the rear portion of the casing, the first stop on the rod, typically consisting of a rim or shoulder arranged on the rod during manufacture, must be intentionally offset towards the rear in order to take into account the chains of tolerances of the control members of the valve means. In addition, the self-adaptive relative rest positions of the piston structure and of the valve plunger, which result in an advance towards the front of the piston structure and of the valve plunger (and also of the actuating rod which is associated with it), raise problems regarding the adjustment of the brake lamp contact when the latter is associated with the brake pedal which is coupled to the actuating rod of the servomotor.

An object of the present invention is to provide an improved servomotor of the type mentioned above which allows the range of the relative self-adaptation of the piston structure and of the valve plunger to be reduced while ensuring that zero dead travel is retained and allowing the problems of adjustment of the brake lamp contact, connected to the brake pedal, to be resolved.

To achieve this, according to a feature of the invention, the first stop on the rod consists of a ring member which is fitted onto the rod and is firmly fixed to the latter in a particular position.

Correlatively, according to another feature of the invention, a process for adjusting a servomotor of the type defined above is characterized in that, the servomotor being assembled with the piston structure bearing against the rear portion of the casing under the effect of the piston spring and the tubular stop member bearing at its second bearing surface against the second or reference stop under the effect of the rod return spring, it comprises the following steps: applying a pulling force to the actuating rod so as to bring the second valve seat into full contact with the valve member, moving the ring member on the actuating rod so as to bring it into contact with the first bearing surface of the tubular stop member, and firmly fixing the ring member to the actuating rod in the position thus obtained.

In this way, the piston structure and the valve plunger are initially positioned (during manufacture in the factory) in positions which are very close to the self-adaptive relative rest positions which they will occupy in the condition of use of the servomotor when installed, when the vacuum chamber will be connected to a source of vacuum, the movement of the rod/plunger assembly relative to this pre-adjusted position being very small, thus not affecting the initial adjustment of the brake lamp contact.

The invention will now be described by way of example with reference to the accompanying drawings, in which: FIG. 1 is a view partially sectioned longitudinally of the rear portion of a vacuum servomotor for assisting with braking according to the invention; and FIGS. 2 and 3 are partial views showing variants relating to the stop ring and its fixing onto the actuating rod.

The braking assistance vacuum servomotor according to the invention typically comprises a casing, of which the central portion of the rear shell 1 is shown, which is divided internally into a front chamber or vacuum chamber 2 and a rear chamber or working chamber 3 by a piston structure, given the general reference 4, which comprises conventionally an annular assembly of a diaphragm and a reinforcing plate attached to a piston hub 5, made of plastic, which encloses a distribution valve means 6 which will be described herein below. The piston structure 4 is biased so that it normally comes to bear against the rear portion of the casing, typically against an internal reinforcement 7 which is fixed to the rear shell 1 and is associated with the means 8 for fixing the casing to a stationary structure of the vehicle, by a piston return spring 9 which is situated in the vacuum chamber 2 and which bears against the front shell (not shown) of the casing. In a rear tubular portion of the hub 5 a resilient annular valve member 10 is arranged which has a front annular face which is intended to cooperate with a first annular valve seat 11 formed centrally in the hub 5 and with a second annular valve seat 12 formed by the rear end of a valve plunger 13 which is slidably mounted in a central bore of the hub 5 and is firmly fixed to an actuating rod 14 of the servomotor. The front face of the valve member 10 is biased axially in the direction towards the first and second valve seats 11 and 12 by a valve member spring 15 which is coaxial with the rod 14 and which bears against a support for the valve member 10 which also forms a bearing point for a rod return spring 16, which is also coaxial with the latter, and which bears at its other end against the front end of a tubular sleeve 17 of a tubular stop member, given the general reference 18, which is freely slidably mounted on a cylindrical shank portion of the actuating rod 14. The rear end of the stop member 18 widens out so as to form a flange portion 19 of enlarged diameter which comprises, on its rear face, angularly spaced ribs 20 which form centrally a first bearing surface which is intended to cooperate with a first stop 21 on the rod, and externally, radially, a second bearing surface which is intended to cooperate with a second or reference stop which is formed typically by the inside front surface of a radially inwardly extending end flange 22 of a stop member or tubular cover given the general reference 23, which is supported on the rear portion of the casing of the servomotor.

According to a feature of the invention, the tubular stop member 18 is made of a plastic material, the rear ribs 20 having an essentially hemispherical external profile centered at the centre of the end ball 24 of the actuating rod 14 onto which the plunger 13 is crimped, the front internal face of the end collar 22 of the cap or tubular stop member 23 (also made of a rigid plastic material) also being hemispherical, of the same radius. In the embodiment shown, the front end of the cap or tubular stop member 23 comprises radially inwardly extending pegs 25 of which are engaged in a peripheral groove in a guide ring 26 which is mounted in the rear neck 27 of the rear shell 1 and which serves to guide the hub 5.

In accordance with the invention, the first stop 21 on the rod 14 consists of a sleeve or ring member which is loosely fitted onto a portion of enlarged diameter 28 of the actuating rod 14 and which will be firmly fixed to the latter, after adjustment, in the manner which will now be described below.

The servomotor is fully assembled, with the piston structure 5 bearing against the rear portion of the casing, typically against the reinforcement 7, under the effect of the piston spring 9, and the tubular stop member 18 bearing, by the second bearing surface formed by the ribs 20, against the reference stop 22 formed by the tubular stop member 23, under the effect of the return spring 16, and with the ring 21 not yet firmly fixed to the portion of enlarged diameter 28 of the actuating rod 14. Owing to the fact that the tubular stop member 17 is freely slidably mounted on the rod 14, the latter and the valve plunger 13 form an assembly which is freely movable axially, through a determined range, relative to the other components of the servomotor. In this condition, a pulling force (towards the right shown in FIG. 1) whose value is less than 0.9 daN is applied to the actuating rod 14 in order to position the second valve seat 12 in full contact with the front face of the valve member 10 without, however, lifting the latter from the first valve seat 11 (the force of the valve spring 15 typically being greater than 1 daN). While keeping the rod 14 in the position thus obtained, the ring 21 is moved relative to the portion of enlarged diameter 28 of the rod 14 so as to bring its front face into contact engagement with the first central stop surface formed by the ribs 20 of the tubular stop member 18 (the latter remaining in contact by its second external bearing surface against the reference stop 22, the force of the rod return spring 16 typically being greater than 8 daN). In the contacting position of the ring 21 thus obtained, the flatter, which is made of steel, for example, is firmly fixed to the portion of enlarged diameter 28 of the rod 14, for example by tightening with radial deformation by contraction onto peripheral notches 29 formed in this portion of enlarged diameter 28. In this final mounting configuration the front face of the valve member 10 is thus in abutment simultaneously with the two substantially coplanar valve seats 11 and 12. When the servomotor is installed in situ and when the vacuum chamber 2 is connected to a source of vacuum, the piston structure 5 will lift very slightly from its stop on the rear portion of the casing, as shown in FIG. 1, before this piston structure and the valve plunger automatically reoccupy the relative rest positions maintaining the front face of the valve member 10 in contact with the two valve seats 11 and 12, this time taking into account the respective pressurizations of the chambers 2 and 3; the pedal, however, which is attached meanwhile to the outer end of the actuating rod 14 is essentially unaffected by this slight movement and the adjustment which was previously made to the brakelamp contact associated with the pedal is not modified.

As the adjustment of this brake lamp contact sometimes imposes a large pulling force, or "pulling-out" force, to be exerted on the actuating rod 14 of the servomotor, the servomotor advantageously comprises a stop key 30 which is mounted in a radial air passage 31 formed in the hub 5 and establishing communication between the sliding bore of the plunger 13 and the rear working chamber 3, and which extends in this bore in order to cooperate with at least one rearwardly directed shoulder 32 formed peripherally on the plunger 13 by an annular groove whose axial dimensions allow the valve means 6 to be opened wide during the return in a manner which is known per se. In this way, by exerting a large pulling force upon the actuating rod 14, this force is transmitted from the plunger 13 to the hub 5 by the key 30, the hub 5 returning into rear abutment against the reinforcement 7, without this pulling force affecting the tubular stop member 18 and the stationary stop 22 of the cap 23, whereby these two members, as mentioned above, may be made of a plastic material of available quality.

In the embodiment shown in FIG. 2, the ring 21 which is made of aluminium or of steel, is firmly fixed to the actuating rod 14 in the required position, by crimping or by magnet shaping, in a peripheral annular groove 33 formed in the portion of enlarged diameter 28 of the actuating rod 14. In the embodiment shown in FIG. 3, the ring 21 is a split ring which is mounted in the open condition upon the portion of enlarged diameter 28 during the adjustment phase, the split ring being allowed to clamp tightly upon the enlarged portion 28 in the required position obtained.

I claim:

1. A braking assistance vacuum servomotor, comprising a casing divided internally into a vacuum chamber and a working chamber by a piston structure biased by a piston spring toward a rear portion of the casing and which comprises a hub enclosing distribution valve means which comprises a first valve seat, formed by the hub, a second valve seat coaxial with said first valve seat and formed by an end of a valve plunger which slides in the hub and which is connected to an actuating rod of said servomotor, and a valve member mounted in said hub and biased axially by a valve spring toward said first and second valve seats so as to cooperate with the seats, and a rod return spring coaxial with said rod and arranged between said hub and a tubular stop member mounted slideably on said rod and which comprises, remote from said rod return spring, first and second bearing surfaces which cooperate with a first stop on said rod and a second reference stop, respectively, characterized in that said first stop comprises a separate ring member mounted on and fixed firmly and permanently to the rod in a predetermined position, the ring member fixed firmly and permanently by deformation of said ring member after the ring member has been placed in abutment with said first bearing surface by means of axial movement of the ring member along said actuating rod while a predetermined pulling force is applied to said rod so as to position said second valve seat in full contact with a front face of the valve member without disengaging the valve member from said first valve seat, and the tubular stop member including a plurality of radially extending, angularly spaced-apart ribs which comprise, centrally, the first bearing surface and, peripherally, the second bearing surface which engages the second reference stop, the plurality of ribs permitting air flow therebetween.

2. The servomotor according to claim 1, characterized in that said second reference stop is formed by a tubular stop part made of a plastic material and supported by said casing.

3. The servomotor according to claim 2, characterized in that said tubular stop member is made of a plastic material.

4. The servomotor according to claim 3, characterized in that the servomotor comprises a stop key mounted in said hub and capable of cooperating with at least one peripheral shoulder of said valve plunger.

5. The servomotor according to claim 4, characterized in that the tubular stop member is mounted on a cylindrical portion of said actuating rod, said ring member fixed firmly to a portion of enlarged diameter of said actuating rod.

6. The servomotor according to claim 1, characterized in that said ring member is fixed firmly to the actuating rod by crimping.

7. The servomotor according to claim 1, characterized in that said ring member is fixed firmly to the actuating rod by clamping.

8. A method of adjusting the stroke travel of a braking assistance servomotor, the servomotor comprising a hub enclosing distribution valve means comprising a first valve seat formed by the hub, a second valve seat formed by an end of a valve plunger which slides in the hub and is connected to an actuating rod of the servomotor, a valve member mounted in the hub and biased axially by a valve spring toward the first and second valve seats so as to cooperate therewith, a rod return spring disposed between the hub and a tubular stop member mounted slidably on the rod, the tubular stop member comprising first and second bearing surfaces which cooperate with a first stop on the rod and a second reference stop, respectively, the tubular stop member including a plurality of radially extending, angularly spaced-apart ribs which comprise, centrally, the first bearing surface and, peripherally, the second bearing surface which engages the second reference stop, the plurality of ribs permitting air flow therebetween, and the first stop comprising a separate ring member mounted on the rod, the method comprising the steps of (a) displacing axially said actuating rod by means of a predetermined pulling force applied to the rod in order to position said second valve seat in contact engagement with a front face of the valve member without disengaging the valve member from said first valve seat, (b) displacing axially the ring member along said actuating rod and into abutment engagement with said spaced-apart ribs, and (c) fixing firmly and permanently the ring member to the actuating rod by means of deforming the ring member so that said ring member remains permanently in position relative to the actuating rod.

* * * * *